United States Patent Office 2,809,146
Patented Oct. 8, 1957

2,809,146

METHOD OF DESTROYING BACTERIA EMPLOYING MERCURIC-CHLORIDE COMPLEXES OF PYRIDINE

Charles W. Osborn, Bartlesville, Okla., and Raymond C. Allred, Kirkwood, Mo., assignors to Phillips Petroleum Company, a corporation of Delaware No Drawing. Application September 21, 1954,
Serial No. 457,564

9 Claims. (Cl. 167—33)

This invention relates to novel bactericidal compounds, compositions and methods of applying the same. In one of its aspects, the invention provides a novel use for mercuric chloride complexes of esters of pyridine-2,5-dicarboxylic acid. In another of its aspects, the invention provides a novel method for the control of bacteria which comprises applying to said bacteria a mercuric chloride complex of an ester of pyridine-2,5-dicarboxylic acid. In a specific aspect, the invention provides as novel compositions, having bactericidal properties, mercuric chloride complexes of diethyl- and di-n-propyl esters of pyridine-2,5-dicarboxylic acid dispersed in a bactericide adjuvant as a carrier therefor. Other aspects as well as advantages of the invention are apparent from this disclosure and the appended claims.

The mercuric chloride complexes of esters of pyridine-2,5-dicarboxylic acid are prepared by bringing together mercuric chloride, dissolved in, say, absolute ethyl alcohol, and the esters of said acid. In a specific preparation, the modus operandi was as follows:

EXAMPLE I

Mercuric chloride complex of the diethyl ester of pyridine-2,5-dicarboxylic acid was prepared in the following manner. 6.8 grams, 0.025 mols, of $HgCl_2$ was dissolved by heating in 20 mls. of absolute ethyl alcohol. An equal molar quantity, 0.025 mol, or 5.58 grams of the diethyl ester of pyridine-2,5-dicarboxylic acid M. P. 46–50° C. was dissolved in 10 mls. of absolute ethyl alcohol and added to the previously prepared mercuric chloride solution. Crystals formed rapidly, and the entire contents set up into a solid mass. This product was cooled and an additional 10 mls. of absolute ethyl alcohol was added. The product was then filtered, washed with 20 mls. absolute ethyl alcohol, and dried overnight at 70° C. The mercuric chloride complex of the diethyl ester of pyridine-2,5-dicarboxylic acid which was obtained was found to be 10.4 grams with a M. P. of 132–134° C., i. e., a yield of 84 percent.

In another specific preparation, the details were as follows:

EXAMPLE II

Mercuric chloride complex of the di-n-propyl ester of pyridine-2,5-dicarboxylic acid was prepared in the following manner. 7.1 grams of $HgCl_2$ was dissolved in 30 mls. absolute alcohol and to this was added 6.6 grams of the di-n-propyl ester of pyridine-2,5-dicarboxylic acid. It was not necessary to dissolve the ester in this case since it was already liquid. The solution was then heated to boiling, cooled in an ice chest, and seeded to induce crystallization. The crystals that were formed were then filtered and washed with 30 mls. of cold absolute ethyl alcohol. The yield of the mercuric chloride complex of the di-n-propyl ester of pyridine-2,5-dicarboxylic acid was found to be 10.2 grams representing a yield of 70 percent. The product was recrystallized from absolute ethyl alcohol and its M. P. was found to be 80–82° C.

The n-propyl complexes were titrated with perchloric acid in glacial acetic acid to determine the molar ratio of salt to ester and it was found to be 1:1.

Calculated: $HgCl_2 \cdot C_{13}H_{17}O_4N$, 523. Found, 520.

The complexes of the invention can be represented by the general formula or molecular arrangement as follows:

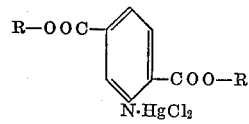

When R is $C_2H_5-$ and/or n-$C_3H_7-$ the compounds are the diethyl-, the di-n-propyl-, or the mixed ethyl-n-propyl esters of pyridine-2,5-dicarboxylic acid.

The following are physical properties of the diethyl and di-n-propyl complexes. The mercuric chloride complex of the di-n-propyl ester of pyridine-2,5-dicarboxylic acid has a M. P. of 80–82° C., is soluble in acetone, methyl alcohol, ethyl acetate, and ethyl alcohol, and is insoluble in water and chloroform. The mercuric chloride complex of the diethyl ester of pyridine-2,5-dicarboxylic acid has a M. P. of 132–134° C., is soluble in acetone, ethyl acetate, hot methyl alcohol, ethyl alcohol, and hot water, and is insoluble in cold water.

While in the bactericidal method of the invention, the last two named compounds are preferred, the R can include up to six carbon atoms in each alkyl group.

It is preferred to use these new bactericides dissolved in a bactericide adjuvant, for example, ethyl alcohol, preferably in concentrations of 0.01 percent to 1 percent bactericide by weight. However, weaker or stronger concentrations may be used depending on the degree of bactericidal effectiveness desired, and the total quantity of bactericidal solution applied. The preferred method of controlling bacteria according to the invention is to directly contact the bacteria with a solution as here described. As other satisfactory bactericide adjuvants there can be used water, mixtures of water and alcohol, and acetone, either alone or in admixture with alcohol or water or both.

EXAMPLE III

The di-n-propyl ester and the diethyl ester of pyridine 2,5-dicarboxylic acid were tested for bactericidal properties using a modification of the paper disk assay procedure of Hoffman and Phillips of the Biological Department, Chemical Corps, Camp Detrick, Maryland. The procedure is as follows:

Several glass Petri dishes were sterilized and provided with Brewer aluminum tops. These aluminum tops had paper disk centers to keep moisture from collecting above the dishes and dripping down therefrom. Into the glass dishes was pipetted 15 ccs. of sterile penicillin assay base agar, consisting of 6 grams peptone, 3 grams yeast extract, 1.5 grams beef extract, and 15 grams of agar in 1000 ccs. of water. When this agar had hardened 5 ccs. of inoculated penicillin assay seed agar was added. This seed agar was composed of 6 grams peptone, 4 grams trypticase, 3 grams yeast extract, 1.5 grams beef extract, 1 gram glucose, and 15 grams of agar in 1000 ccs. of water, and had been inoculated by adding 0.3 cc. of 48 hour broth culture of either *Micrococcus pyogenes* var. *aureus* or *Escherichia coli* to each 100 ccs. of agar.

When the media had hardened, a standard penicillin assay disk, a thick porous paper 12.5 mms. in diameter, was placed in the center of each plate. A solution of either the mercuric di-n-propyl ester of pyridine 2,5-dicarboxylic acid or the mercuric chloride complex of the diethyl ester of pyridine 2,5-dicarboxylic acid in absolute ethyl alcohol was placed on the disk in the amount of 0.07 cc.

The plates were then incubated at 37° C. and read at 24 and 48 hours. The zone of inhibition was read by holding the plate to the light and measuring the generally circular zone where no bacteria growth occurred. A zone of 12.5 mms. indicates no inhibition since it is the diameter of the test disk used. The results of these runs are tabulated below.

*Table I*

HgCl$_2$ COMPLEX OF DIETHYL ESTER OF PYRIDINE 2,5-DICARBOXYLIC ACID

| Concentration | Zone of Inhibition (mm.) | | | |
|---|---|---|---|---|
| | S. aureus | | E. coli | |
| | 24 hr. | 48 hr. | 24 hr. | 48 hr. |
| 10,000 p. p. m. | 43 | 42 | 37 | 36 |
| 1,000 p. p. m. | 34 | 33 | 26 | 25 |
| 100 p. p. m. | 24 | 23 | 22.5 | 21 |
| 10 p. p. m. | 15.5 | 14 | 13.5 | 12 |
| 1 p. p. m. | 12.5 | 12.5 | 12.5 | 12.5 |

*Table II*

HgCl$_2$ COMPLEX OF DI-N-PROPYL ESTER OF PYRIDINE-2,5-DICARBOXYLIC ACID

| Concentration | Zone of Inhibition (mm). | | | |
|---|---|---|---|---|
| | S. aureus | | E. coli | |
| | 24 hr. | 48 hr. | 24 hr. | 48 hr. |
| 10,000 p. p. m. | 41 | 40 | 31 | 30 |
| 1,000 p. p. m. | 33 | 32 | 31 | 30 |
| 100 p. p. m. | 22 | 21 | 23 | 22 |
| 10 p. p. m. | 16 | 15 | 15 | 14 |
| 1 p. p. m. | 15 | 12.5 | 12.5 | 12.5 |

The same test for bactericidal properties was run on commercial tincture of merthiolate and solutions of commercial mercuric chloride. The results of these tests are given below.

*Table III*

| Compound | Concentration, p. p. m. | Zone of Inhibition After 48 hours (mm.) | |
|---|---|---|---|
| | | S. aureus | E. coli |
| Merthiolate | 1,000 | 33.5 | 20 |
| Mercuric Chloride | 10,000 | 47 | 40 |
| Mercuric Chloride | 1,000 | 31 | 33 |

*Table IV*

(Comparative)

| Compound | Concentration, p. p. m. | Zone of Inhibition After 48 hours (mm.) | |
|---|---|---|---|
| | | S. aureus | E. coli |
| HgCl$_2$ Complex of the Diethyl-ester Pyridine-2,5-Dicarboxylic Acid | 1,000 | 33 | 25 |
| HgCl$_2$ Complex of Di-n-propyl Ester of Pyridine-2,5-Dicarboxylic Acid | 1,000 | 32 | 30 |
| Merthiolate | 1,000 | 33.5 | 20 |
| Mercuric Chloride | 1,000 | 31 | 33 |

Table IV shows that these new bactericides compare favorably with known bactericides such as merthiolate and mercuric chloride.

EXAMPLE IV

A broth was made up containing 1.5 grams proteose peptone, 1.5 grams neopeptone, 1.5 grams yeast extract, and 1500 mls. of water. The pH of this broth was adjusted to 7.2, and the broth was then steam sterilized for 15 minutes at a pressure of 15 pounds gauge. A sample of this broth was then inoculated with one drop of an actively growing 24 hour culture of the organism on which the bactericide was to be tested. Four ml. samples of this inoculated broth were placed in 13 by 100 mm. test tubes, and designated amounts of the bactericides were added to give the desired concentration of bactericide. These samples were then incubated at 25° C. and the results read at 24 and 48 hours. The concentration of bactericide is based on 100 percent active ingredients.

*Table V*

TESTING OF HgCl$_2$ COMPLEX OF THE DI-N-PROPYL ESTER OF PYRIDINE-2,5-DICARBOXYLIC ACID AGAINST VARIOUS ORGANISMS

| Organism | 1 p.p.m. | 5 p.p.m. | 10 p.p.m. | 25 p.p.m. | 50 p.p.m. | 100 p.p.m. | Time hours | Control (No Bactericide Present) |
|---|---|---|---|---|---|---|---|---|
| Escherichia coli | ± | ± | − | − | − | − | 24 | ++ |
| | ± | − | − | − | − | − | 48 | ++ |
| Pseudomonas specie | ++ | ± | − | − | − | − | 24 | ++ |
| | ++ | − | − | − | − | − | 48 | ++ |
| Bacillus subtilis | ++ | + | ± | ± | ± | − | 24 | ++ |
| | ++ | + | ± | ± | ± | − | 48 | ++ |
| Serratia marcescens | ++ | ± | − | − | − | − | 24 | ++ |
| | ++ | − | − | − | − | − | 48 | ++ |
| Proteus vulgaris | ± | ± | ± | − | − | − | 24 | ++ |
| | ± | ± | ± | − | − | − | 48 | ++ |
| Klebsiella pneumoniae | ++ | ++ | + | ± | − | − | 24 | ++ |
| | ++ | ++ | − | ± | − | − | 48 | ++ |
| Aerobacter aerogenes | + | + | ± | ± | ± | − | 24 | ++ |
| | + | + | ± | ± | ± | − | 48 | ++ |
| Staphylcoccus aureus | ± | − | − | − | − | − | 24 | ++ |
| | ± | − | − | − | − | − | 48 | ++ |
| Sarcina specie | − | − | − | − | − | − | 24 | + |
| | − | − | − | − | − | − | 48 | ++ |
| Bacillus cereus | − | − | − | − | − | − | 24 | ++ |
| | − | − | − | − | − | − | 48 | ++ |

++ = Full growth, identical with control.
+ = Fair growth.
± = Little growth.
− = No growth.

Table VI

TESTING OF HgCl₂ COMPLEX OF THE DIETHYL ESTER OF PYRIDINE-2,5-DICARBOXYLIC ACID AGAINST VARIOUS ORGANISMS

| Organism | 1 p.p.m. | 5 p.p.m. | 10 p.p.m. | 25 p.p.m. | 50 p.p.m. | 100 p.p.m. | Time hours | Control (No Bactericide Present) |
|---|---|---|---|---|---|---|---|---|
| Escherichia coli | + | - | - | - | - | - | 24 | ++ |
|  | ++ | - | - | - | - | - | 48 | ++ |
| Pseudomonas specie | + | ± | - | - | - | - | 24 | ++ |
|  | ++ | ± | - | - | - | - | 48 | ++ |
| Bacillus subtilis | ++ | ++ | ++ | + | ± | - | 24 | ++ |
|  | ++ | ++ | ++ | + | ± | - | 48 | ++ |
| Serratia marcescens | + | ± | - | - | - | - | 24 | ++ |
|  | ++ | ± | - | - | - | - | 48 | ++ |
| Proteus vulgaris | ± | ± | ± | - | - | - | 24 | ++ |
|  | + | ± | ± | - | - | - | 48 | ++ |
| Klebsiella pneumoniae | + | ± | - | - | - | - | 24 | ++ |
|  | + | ± | - | - | - | - | 48 | ++ |
| Aerobacter aerogenes | ++ | + | + | + | + | - | 24 | ++ |
|  | ++ | + | + | + | + | - | 48 | ++ |
| Staphylcoccus aureus | - | - | - | - | - | - | 24 | ++ |
|  | - | - | - | - | - | - | 48 | ++ |
| Sarcina specie | - | - | - | - | - | - | 24 | + |
|  | - | - | - | - | - | - | 48 | + |
| Bacillus cereus | ± | - | - | - | - | - | 24 | ++ |
|  | + | - | - | - | - | - | 48 | ++ |

++ = Full growth, identical with control.
+ = Fair growth.
± = Little growth.
- = No growth.

Mercuric chloride complexes of esters of pyridine-2,5-dicarboxylic acid and a method for preparation of same are disclosed and claimed in the copending application of Carl W. Kruse and A. Merrill Schnitzer, Serial No. 457,568, filed even date September 21, 1954.

Reasonable variation and some modification are possible within the scope of the foregoing disclosure and the appended claims to the invention, the essence of which is that certain mercuric chloride esters of pyridine-2,5-dicarboxylic acid, especially the diethyl- and the di-n-propyl esters, have been set forth as bactericidal in character, a method for controlling or killing bacteria employing at least one of said compounds has been set forth and that a novel bactericidal composition has been set forth all substantially as described.

We claim:

1. A method of inhibiting the growth of bacteria which comprises contacting said bacteria with a mercuric chloride complex of an ester of pyridine-2,5-dicarboxylic acid in an amount effective to inhibit the growth of said bacteria.

2. A method of inhibiting the growth of bacteria which comprises contacting said bacteria with a mercuric chloride complex of diethyl ester of pyridine-2,5-dicarboxylic acid in an amount effective to inhibit the growth of said bacteria.

3. A method of inhibiting the growth of bacteria which comprises contacting said bacteria with a mercuric chloride complex of di-n-propyl ester of pyridine-2,5-dicarboxylic acid in an amount effective to inhibit the growth of said bacteria.

4. A method of preventing the growth of bacteria which comprises applying to said bacteria a solution of a mercuric chloride complex of an ester of pyridine-2,5-dicarboxylic acid dissolved in a bactericide adjuvant.

5. A method according to claim 4 wherein the adjuvant is a material selected from the group of solvents consisting of ethyl alcohol, acetone, a mixture of water and alcohol, a mixture of acetone and alcohol, and a mixture of acetone, alcohol and water.

6. A method according to claim 5 wherein the complex is a complex selected from the group consisting of diethyl- and di-n-propyl esters of pyridine-2,5-dicarboxylic acid.

7. A method of controlling bacteria which comprises applying to said bacteria

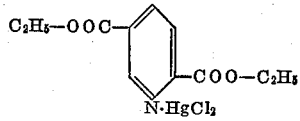

8. A method of controlling bacteria which comprises applying to said bacteria

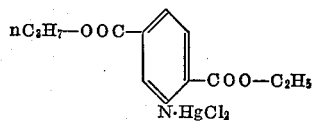

9. A method of controlling bacteria which comprises applying to said bacteria

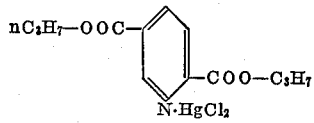

References Cited in the file of this patent

UNITED STATES PATENTS 2,118,864   Reppe _____ May 31, 1938
2,657,207   Herring _____ Oct. 27, 1953

OTHER REFERENCES

Frear: Chem. of Insecticides, Fungicides and Herbicides, 2nd ed. (1948), p. 254.